United States Patent [19]

Cox

[11] 4,021,404

[45] May 3, 1977

[54] ANTIHARDENERS FOR POLYMERS

[75] Inventor: William L. Cox, Mogadore, Ohio

[73] Assignee: The Goodyear Tire & Rubber Company, Akron, Ohio

[22] Filed: Oct. 1, 1975

[21] Appl. No.: 618,528

[52] U.S. Cl. .................. 260/42.32; 260/45.9 NC; 260/799

[51] Int. Cl.$^2$ ........................................ C08K 5/20

[58] Field of Search ......... 260/45.9 NC, 799, 42.32

[56] References Cited

UNITED STATES PATENTS

| | | | |
|---|---|---|---|
| 3,676,395 | 7/1972 | Pied | 260/45.9 NC |
| 3,714,122 | 1/1973 | Kline | 260/45.9 NC |
| 3,767,628 | 10/1973 | Kline | 260/45.9 NC |
| 3,784,565 | 1/1974 | Parker | 260/45.9 NC |
| 3,867,334 | 2/1975 | Maxey | 260/45.9 NC |
| 3,907,893 | 9/1975 | Parker | 260/45.9 NC |
| 3,928,296 | 12/1975 | Kavchok | 260/45.9 NC |

*Primary Examiner*—V. P. Hoke
*Attorney, Agent, or Firm*—F. W. Brunner; J. A. Rozmajzl

[57] ABSTRACT

Amide compounds such as N-(phenyl)propenamide and N-(phenyl)-2-methylpropenamide are added to certain diene polymers such as SBR, NBR and natural rubber, preferably prior to compounding with reinforcing agents such as carbon black, thereby improving the hardening resistance of the subsequently sulfur vulcanized polymer.

9 Claims, No Drawings

ANTIHARDENERS FOR POLYMERS

This invention relates to reinforced diene vulcanizates which are resistant to hardening. More particularly, this invention relates to a process of improving the resistance of certain loaded diene rubber vulcanizates to hardening.

Various diene rubber vulcanizates have been known to harden while being stored or used at elevated temperatures. The hardening can be due to changes in the cross-link structure of the polymer, resinification or cyclization of the polymer or bridging of the polymer chains. Hardening can cause tire treads to crank or chunk, hoses to split, gaskets to fail to seal properly and belt covers to crack. It will manifest itself as an increase in hardness, an increase in modulus, a decrease in elongation and sometimes as a decrease in tensile strength.

It is an object of the present invention to provide a process for improving the resistance of certain reinforced diene rubber vulcanizates to hardening. It is also an object of the present invention to provide unvulcanized reinforced rubber compositions which can be vulcanized into reinforced rubber vulcanizates which are resistant to hardening. Other objects will become apparent as the description proceeds.

The objects of the present invention are accomplished by adding an amide to the unvulcanized diene rubber, preferably prior to the addition of a substantial amount of the reinforcing agent.

The amide has the following structural formula:

$$R - \left[ \begin{matrix} N - C - C = CHR^3 \\ | \quad \| \quad | \\ R^1 \quad O \quad R^2 \end{matrix} \right]_x \quad (I)$$

wherein $x$ is 1 or 2, and wherein when $x$ is 1, R is selected from the group consisting of aryl radicals having 6 to 13 carbon atoms (6–13C), alkyl radicals (4–18C), cycloalkyl radicals (5–12C), and aralkyl radicals (7–13C) and wherein when $x$ is 2, R is selected from the group consisting of arylene radicals (6–13C), alkylene radicals (4–18C), cycloalkylene radicals (5–12C), aralkylene radicals (7–13C) and alkylenediaryl radicals having the structure $$-\underset{}{\underset{}{\bigcirc}}\overset{R^5}{\underset{}{}}\; R^4\; \underset{}{\underset{}{\bigcirc}}\overset{R^6}{\underset{}{}}-\;;$$

$R^1$ is selected from the group consisting of hydrogen and alkyl radicals (1–12C); $R^2$ is selected from the group consisting of hydrogen, alkyl radicals (1–4C), aryl radicals (6–12C), aralkyl radicals (7–13C), cycloalkyl radicals (5–12C), carboxymethyl and carboxymethyl radicals (2–5C) and wherein $R^3$ is selected from the group consisting of hydrogen, alkyl radicals (1–4C), phenyl, substituted phenyl, cyclohexyl, carboxy and carbalkoxy (2–5C) and wherein $R^4$ is an alkylene radical (1–4C) and $R^5$ and $R^6$ are selected from the group consisting of methyl and ethyl.

When R is an aryl or arylene radical the aryl portion can be unsubstituted or contain in addition to the 6–13 carbon atoms in the aryl portion, 1 or 2 substituents selected from the group consisting of methyl, ethyl, methoxy, ethoxy, carboxyalkyl (2–9C), carboxyaryl (7–9C) and chloro.

When $R^3$ is a substituted phenyl, it is substituted with 1 or 2 substituents selected from the group consisting of methyl, ethyl, methoxy, ethoxy, carboxyalkyl (2–9C), carboxyaryl (7–9C) and chloro.

In a preferred embodiment, $x = 1$, $R^3$ is hydrogen, $R^2$ is hydrogen, methyl or ethyl, and $R^1$ is hydrogen, methyl or ethyl.

In a particularly preferred embodiment, $R^1$ and $R^3$ are hydrogen, $R^2$ is hydrogen or methyl, and R is phenyl, tolyl or alkyl (8–12C).

Representative amides which can be used in the practice of the present invention include the following.

N-phenyl-2-methylpropenamide
N-phenylpropenamide
N-(4-methylphenyl)-2-methylpropenamide
N-(1-naphthyl)-2-ethylpropenamide
N-butyl-N-ethyl-2-phenyl-2-heptenamide
N-cyclooctyl-2-butenamide
N-benzyl-2-pentenamide
N-octadecylpropenamide
N-(1-methylheptyl)-2-methylpropenamide
N-(4-carbethoxyphenyl)propenamide
N-methyl-N-(4-chlorophenyl)-2-methylpropenamide
N,N-dihexyl-2-cyclohexylpropenamide
N-(2,4-dimethylphenyl)-3-cyclohexylpropenamide
N-(4-benzoxyphenyl)-2-methylpropenamide
N-(1,1-dimethylethyl)-propenamide
4,4'-bis(2-methylpropenamido)diphenylmethane
1,4-bis(2-methoxypropenamido)benzene
1,6-bis(2-propenamido)hexane
N-oxydiethyl-2-methylpropenamide
1,4-bis(propenamido)cyclohexane
1,5-bis(-2-methylpropenamido)naphthalene The method of preparing the amides is not critical to the performance of these compounds in the practice of the present invention.

The amides can be prepared by reacting, normally in substantially equal molar amounts, an amine of the structure $$R - \underset{R^1}{\underset{|}{N}}H \quad \text{or} \quad HN - R - NH \atop R^1 \quad\quad R^1$$

with an acid halide of the structure $$X - \underset{O}{\underset{\|}{C}} - \underset{R^2}{\underset{|}{C}} = CHR^3$$

wherein R, $R^1$, $R^2$ and $R^3$ are as defined earlier herein and X is chloro or bromo, in the presence of an acid absorbing agent which may be an inorganic salt, e.g., sodium carbonate, or an organic tertiary amine, e.g., triethylamine. The reaction is usually carried out by dropwise addition of a solution of the acid halide in an aprotic solvent to a solution of the amine which contains in solution or in suspension a compound capable of reacting with the hydrogen halide formed during the reaction. A slight excess of acid halide may be used. The reaction is usually exothermic so the temperature during reaction is held to a maximum of 50° C. by means of an ice water bath. The reaction mixture is stirred for an hour or more after the addition of acid halide has been completed. The product usually precipitates during the course of the reaction. It is then filtered off, dried, and purified as necessary.

Examples of amines which can be used in preparing the amides are as follows.

aniline
p-toluidine
m-toluidine
p-chloroaniline
α-naphthylamine
4-aminobiphenyl
2-aminooctane
1,6-hexanediamine
N-methylaniline
2,4-dimethylaniline
p-phenylenediamine
4,4'-diaminodiphenylmethane
p-aminobenzophenone
p-methoxyaniline
octadecylamine
dodecylamine
benzylamine
1,4-diaminocyclohexane
1,5-diaminonaphthalene The following examples illustrate the preparation of the antihardeners of the present invention.

EXAMPLE 1

134.5 Grams of octadecylamine was dissolved in one liter of ethanol and 40 grams of sodium carbonate was suspended in the solution. To the mixture was added dropwise 57.5 grams of methacryloyl chloride. The addition was accomplished in 45 minutes at a reaction temperature of 55°-65° C. The reaction mixture was cooled to room temperature and was filtered. The filter cake was washed thoroughly with water to remove inorganic salts and was then dried. There remained 108 grams of N-octadecylmethacrylamide (or N-octadecyl-2-methylpropenamide) which melted at 59°-61° C.

EXAMPLE 2

108 Grams of p-phenylenediamine was dissolved in 2 liters of ethanol and 159 grams of sodium carbonate was suspended in the solution. 230 Grams of methacryloyl chloride was added dropwise to the mixture in 50 minutes. The reaction temperature rose during the addition from 25° C. to 48° C. The solid which precipitated during the reaction was filtered off, washed thoroughly with water to remove inorganic salts, and allowed to dry. There was obtained 235 grams of 1,4-dimethacrylamidobenzene which melted at 254°-257° C.

EXAMPLE 3

A 3-liter flask was charged with 186 grams (2 moles) of aniline, 120 grams of NaOCH$_3$ (2.22 moles) and 1300 milliliters of toluene. The mixture was stirred for 5 minutes and then 220 milliliters (2.07 moles) of methyl methacrylate was added. The mixture was then heated to reflux and azeotrope was slowly distilled off. One thousand milliliters of distillate was collected. The reaction flask was cooled to 50° C. and 500 milliliters of hexane was slowly added. The mixture was stirred for 15 minutes and then the salt was filtered off. The filter cake was then thoroughly washed with hexane.

The salt was then hydrolyzed in a blender with excess dilute hydrochloric acid. The product was then filtered off, washed with water and dried. The yield of product was about 225 grams (70%), with a melting point of 84° C. to 85° C.

The level of antihardener which can be used effectively in the practice of the present invention should generally not be less than 0.25 part per 100 parts by weight of uncompounded diene rubber. Preferably the level is at least 0.5 part. The upper level of amide antioxidant that can be used is 5.0 parts and higher. Preferably, however, the upper level will not exceed 2.0 parts. A preferred range of antioxidant is from 1.0 part to 1.5 parts.

The amides of the present invention can be used alone or in combination. They are preferably added to the diene rubber prior to the addition of the reinforcing agent.

A reinforcing agent interacts with the rubber to increase the modulus and hardness of the rubber. Typical well known reinforcing agents are the carbon blacks (such as HAF, SAF, ISAF, SRF, FEF and GPE blacks) and silicas such as precipitated fine particle size hydrated amorphous silicas and fumed silicas (non-hydrated). Other non-black reinforcing agents are calcium silicate, aluminum silicate and silica. A discussion of rubber reinforcing agents appears in *Reinforcement of Elastomers* by Gerard Kraus, Interscience Publishers, a Division of John Wiley and Sons, Inc. (New York, London and Sidney), copyrighted 1965.

It has been discovered that time of addition of the amide can affect the antihardening improvements to be obtained. If the amide is added prior to the addition of the reinforcing agent, the vulcanizate will be more resistant to hardening than if the amide is added after reinforcing agent addition. The larger the amount of the reinforcing agent added prior to the amide addition, the greater is the tendency of the vulcanizate to harden. The amide therefore preferably is added before all of the reinforcing agent has been added. Preferably the amide is added before half of the reinforcing agent is added. More preferably the amide is added before a third or even a quarter of the reinforcing agent has been added. That is to say that the amide is added before a substantial amount of reinforcing agent is added. Most preferably the amide is added before any of the reinforcing agent is added. As a guideline, the polymer to which the amide is added should normally contain less than 30 parts by weight of reinforcing agent per 100 parts by weight of polymer when the amide is added, preferably less than 20 parts and most preferably less than 10 parts. The remainder of all of the reinforcing agent is then added.

Five different antihardening agents were evaluated in both natural rubber and oil extended SBR at the 1.0 part level. The antihardeners are listed below.

Antihardener Key List
- a   N-phenylmethylpropenamide
- b   N-phenylpropenamide
- c   1,4-bis(-2-methylpropenamido)benzene
- d   4,4'-bis(2-methylpropenamido)benzene
- e   N-octadecyl-2-methylpropenamide

| Stock | Parts by Weight | | |
|---|---|---|---|
| | A | B | C |
| Natural rubber | 100 | — | — |
| Oil extended SBR | — | 100 | 100 |
| AnO | 5 | 5 | 3 |
| MgO | 5 | 5 | 5 |

-continued

| | | | |
|---|---|---|---|
| Stearic acid | 2 | 1 | 1 |
| SRF black | 60 | 60 | 60 |
| Processing oil | 5 | 5 | 5 |
| Sulfur | — | — | 1.75 |
| Tetramethylthiuram disulfide | 1.5 | 2.25 | — |
| 2-(morpholinodithio)-benzothiazole | 1.5 | 1.50 | 1.00 |
| 2-(morpholinothio)-benzothiazole | 1.0 | 1.00 | — |
| Zinc dimethyl dithiocarbamate | — | 1.00 | — |
| -N(morphoinothio)-phthalimide | — | 1.00 | — |
| Antihardener | 0 or 1.0 | 0 or 1.0 | 0 or 1.0 |

In all of the examples where an antihardener was used, it was added prior to the addition of the carbon black. The compounded rubbers were vulcanized at optimum times and temperatures, and then aged for various times at various temperatures. The aged tensiles (meganeutons) and elongations (percent) were measured. The tensile x elongation products $x\ 10^{-3}$ are shown in the following tables.

Table I

| | Example | | | | | |
|---|---|---|---|---|---|---|
| | 4 | 5 | 6 | 7 | 8 | 9 |
| Stock | A | A | A | A | A | A |
| Antihardener | — | a | b | c | d | e |
| Tensile×Elongation×$10^{-3}$ | | | | | | |
| Original | 9.6 | 9.5 | 10.5 | 10.1 | 9.5 | 9.4 |
| 70 hrs. at 121° C. | 3.2 | 6.9 | 6.3 | 5.5 | 6.6 | 3.5 |
| 7 days at 100° C. | 5.0 | 6.2 | 6.1 | 6.7 | 5.8 | 5.2 |
| 14 days at 100° C. | 4.4 | 5.0 | 5.5 | 5.5 | 5.5 | 4.4 |
| 28 days at 70° C. | 4.0 | 6.1 | 6.3 | 5.8 | 5.8 | 4.0 |

Table II

| | Example | | | | | |
|---|---|---|---|---|---|---|
| | 10 | 11 | 12 | 13 | 14 | 15 |
| Stock | B | B | B | B | B | B |
| Antihardener | — | a | b | c | d | e |
| Tensile×Elongation×$10^{-3}$ | | | | | | |
| Original | 4.8 | 5.3 | 4.9 | 5.0 | 5.0 | 5.1 |
| 70 hrs. at 121° C. | 1.2 | 2.1 | 1.9 | 1.3 | 1.6 | 1.6 |
| 7 days at 100° C. | 3.1 | 4.4 | 4.2 | 4.3 | 3.9 | 3.9 |
| 14 days at 100° C. | 2.7 | 4.2 | 4.2 | 2.9 | 3.7 | 4.2 |
| 28 days at 70° C. | 2.9 | 3.9 | 3.9 | 4.3 | 3.5 | 3.2 |

Table III

| | Example | | | | | |
|---|---|---|---|---|---|---|
| | 16 | 17 | 18 | 19 | 20 | 21 |
| Stock | C | C | C | C | C | C |
| Antihardener | — | a | b | c | d | e |
| Tensile×Elongation×$10^{-3}$ | | | | | | |
| Original | 10.6 | 9.3 | 10.7 | 9.9 | 10.2 | 10.4 |
| 70 hrs. at 100° C. | 7.2 | 9.2 | 9.0 | 8.8 | 7.6 | 9.0 |
| 22 hrs. at 121° C. | 5.2 | 5.4 | 7.4 | 6.7 | 5.9 | 6.1 |
| 7 days at 100° C. | 4.2 | 4.4 | 6.6 | 5.4 | 4.5 | 4.9 |
| 28 days at 70° C. | 5.7 | 6.4 | 6.9 | 6.3 | 6.1 | 6.5 |

The above data demonstrate that each of the antihardeners offered some protection against tensile x elongation deterioration on heat aging both in natural rubber and SBR. It should be noted that all of the vulcanized products possessed improved aging properties when an antihardener was used, even though stocks A and B used high efficiency vulcanization systems while stock C used a low efficiency system.

Any of the compounds recited earlier herein as well as any compound conforming to structural formula (I) could have been substituted in the above examples to provide antihardening protection.

It should be noted that the present invention benefits all types of sulfur and sulfur donor vulcanization systems. Although the efficient and semi-efficient vulcanization systems benefit more through the practice of the present invention, even low efficiency, for example, high sulfur vulcanization systems benefit. Such systems are described in the two articles appearing in "Rubber Age," the November and December issue of 1967, the articles being entitled "EV Systems For NR-Part 1" and "EV Systems For NR-Part 2," as well as in the Natural Rubber Technical Information Sheets Nos. 118 and 119, published by the Natural Rubber Producers Research Association. EV and semi-EV systems are characterized by the fact that they provide a large number of sulfur crosslinks for a given amount of sulfur, whether added as free sulfur or resulting from a sulfur donor, i.e., a compound capable of providing sulfur such as tetramethyl thiuram disulfide or 2-(morpholinodithio)-benzothiazole. Normally a low level of sulfur is used, for example 0.7 part by weight per 100 parts by weight of polymer and even a 0.5 part and below. In fact, sulfurless systems using sulfur donors are particularly efficient systems. The object of an efficient or semi-efficient system is to provide as many monosulfidic crosslinks as possible and as few cyclic sulfide groups as possible.

Silica-type reinforcing agents could have been substituted in the previous examples for the carbon black, and improvements based on order of addition would have been obtained.

Any of the conventional compounding techniques, e.g., banburying and milling, can be used.

The diene polymers which will benefit by the practice of the present invention are those polymers prepared from conjugated diene momoner. The diene polymer can be a homopolymer or a copolymer of diene monomer and one or more comonomers. The copolymer will contain at least 40 parts by weight per 100 parts by weight of polymer of one or more segmeric forms of conjugated diene monomer, preferably at least 50 parts and most preferably at least 60 parts. Illustrative conjugated 1,3-diene monomers are butadiene-1,3; isoprene; 2-chlorobutadiene; 2-ethyl-butadiene-1,3; and 2,3-dimethyl butadiene-1,3. Copolymerizable monomers include vinyl and vinylidene monomers such as styrene, α-methyl styrene, divinyl benzene, vinyl acetate, vinylidene chloride, methylmethacrylate, ethylacrylate, the vinyl pyridines including 2-vinyl pyridine; 5-methyl-2-vinyl pyridine; 4-vinyl pyridine and 2-vinyl-5-ethyl pyridine; acrylonitrile, methacrylonitrile, methacrylic acid and acrylic acid. Mixtures of the diene monomers and mixtures of the comonomers can be used.

If the polymer contains a substantial amount of a built-in antihardener, for example, the amide-containing polymers described in U.S. Pat. No. 3,658,769, then the benefit of the present invention could be minimal or nonexistent. As a guideline, a polymer containing 0.25 part by weight of such a built-in antihardener would probably not benefit from the practice of the present invention. It is to be understood, therefore, that a vulcanizate having a tendency to harden would not include polymers which have no such tendency.

The term sulfur-type vulcanization system is intended to include free-sulfur or sulfur donor systems as well as combinations thereof.

While certain representative embodiments and details have been shown for the purpose of illustrating the invention, it will be apparent to those skilled in this art that various changes and modifications may be made therein without departing from the spirit or scope of the invention.

I claim:

1. An unvulcanized conjugated diene having incorporated therein a compound having the following structural formula:

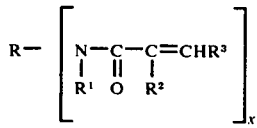

wherein $x$ is 1 or 2, and wherein when $x$ is 1, R is selected from the group consisting of aryl radicals having 6 to 13 carbon atoms (6–13C), alkyl radicals (4–18C), cycloalkyl radicals (5–12C), and aralkyl radicals (7–13C) and wherein when $x$ is 2, R is selected from the group consisting of arylene radicals (6–13C), alkylene radicals (4–18C), cycloalkylene radicals (5–12C), aralkylene radicals (7–13C) and alkylenediaryl radicals having the structure

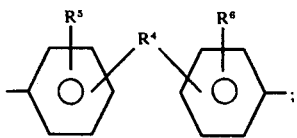

$R^1$ is selected from the group consisting of hydrogen and alkyl radicals (1–12C); $R^2$ is selected from the group consisting of hydrogen, alkyl radicals (1–4C); aryl radicals (6–12C), aralkyl radicals (7–13C), cycloalkyl radicals (5–12C) and carboxymethyl, wherein $R^3$ is selected from the group consisting of hydrogen, alkyl radicals (1–4C), phenyl, substituted phenyl, cyclohexyl, carboxy and carbalkoxy (2–5C) and wherein $R^4$ is an alkylene radical (1–4C) and $R^5$ and $R^6$ are selected from the group consisting of methyl and ethyl, wherein when $R^3$ is a substituted phenyl it is substituted with one or two substituents selected from the group consisting of methyl, ethyl, methoxy, ethoxy, carboxy alkyl of 2 to 9 carbon atoms, carboxy aryl of 7 to 9 carbon atoms and chloro.

2. The unvulcanized conjugated diene polymer of claim 1 having incorporated therein a reinforcing agent.

3. The polymer of claim 2 wherein the reinforcing agent is carbon black.

4. The polymer of claim 3 wherein the amide is added to the polymer prior to the addition of a substantial amount of the carbon black.

5. A vulcanizate prepared by vulcanizing unvulcanized conjugated diene polymer of claim 1 with an efficient or semi-efficient sulfur type vulcanization system.

6. The vulcanizate according to claim 5 wherein the vulcanization system contains 0 to 0.5 part by weight of free sulfur per 100 parts by weight of polymer.

7. The polymer of claim 1 wherein the conjugated diene is butadiene-1,3.

8. The polymer of claim 1 wherein the polymer is a copolymer containing at least 40 parts by weight of butadiene-1,3 per 100 parts by weight of polymer and as a comonomer a monomer selected from the group consisting of styrene and acrylonitrile.

9. The polymer of claim 8 wherein the comonomer is styrene.

* * * * *